(12) United States Patent
Anderson

(10) Patent No.: US 7,621,578 B2
(45) Date of Patent: Nov. 24, 2009

(54) OPEN-BED UTILITY TRAILER CONVERTIBLE TO A CLOSED UTILITY TRAILER BY THE ADDITION OF A CLOSED CARGO BOX

(76) Inventor: Steven Trent Anderson, 1383 S. Star Cir., Saratoga Springs, UT (US) 84043

( * ) Notice: Subject to any disclaimer, the term of this patent is extended or adjusted under 35 U.S.C. 154(b) by 0 days.

(21) Appl. No.: 11/268,306

(22) Filed: Nov. 7, 2005

(65) Prior Publication Data
US 2007/0102948 A1 May 10, 2007

(51) Int. Cl.
B62D 23/00 (2006.01)
(52) U.S. Cl. .................................................. 296/35.3
(58) Field of Classification Search ............. 296/35.3, 296/35.1, 24.3, 181.1, 181.3, 181.7, 182.1, 296/186.5, 193.03, 193.04, 36, 10, 12; 119/405
See application file for complete search history.

(56) References Cited
U.S. PATENT DOCUMENTS

| | | | | |
|---|---|---|---|---|
| 2,995,397 A * | 8/1961 | Eames | ........................ | 296/164 |
| 3,289,868 A * | 12/1966 | Miller et al. | ................... | 254/45 |
| 3,415,490 A * | 12/1968 | Steele | ........................... | 254/45 |
| 3,599,817 A * | 8/1971 | Bargman, Jr. | ................ | 414/498 |
| 3,828,379 A * | 8/1974 | Walston | ....................... | 114/344 |
| 4,147,267 A * | 4/1979 | Mai | ............................ | 414/498 |
| 4,468,046 A * | 8/1984 | Rutherford | ................... | 280/416 |
| 5,593,272 A * | 1/1997 | Green | ......................... | 414/498 |
| 6,499,783 B1 * | 12/2002 | Husted | ..................... | 296/24.31 |

* cited by examiner

Primary Examiner—Hilary Gutman
(74) Attorney, Agent, or Firm—Angus C. Fox, III

(57) ABSTRACT

A utility trailer convertible between an open bed configuration and a cargo box configuration includes an open-bed trailer and a removable cargo box. The bed of the trailer includes multiple full-length, parallel, longitudinal grooves. Adjacent each groove is a rail that is elevated slightly above the elevation of the bed. The rails function both as deck protectors and friction reducers for the cargo box that is designed for a slide-in, non-interference fit between the walls of the trailer. The cargo box-has a sheathing covered frame with a door at the rear end thereof. Multiple anchors that align with the grooves, are attached to the underside of the cargo box frame. When properly positioned on the trailer, the anchors are removably securable to the bed. Multiple jacks can be used to elevate the cargo box and slide the trailer from beneath the cargo box.

17 Claims, 15 Drawing Sheets

OPEN-BED UTILITY TRAILER CONVERTIBLE TO A CLOSED UTILITY TRAILER BY THE ADDITION OF A CLOSED CARGO BOX

BACKGROUND OF THE INVENTION

1. Field of the Invention

This invention relates to trailers and, more particularly, to open-bed, walled utility trailers that can be converted to closed utility trailers by the addition of an enclosed cargo box.

2. Description of the Prior Art

Utility trailers having cargo boxes are used extensively by workers in the construction industry to haul valuable tools and supplies to job sites. Open bed, walled utility trailers, on the other hand, are used extensively to haul motorcycles, all-terrain vehicles, and other motorized equipment to recreational sites. For such an application, a utility trailer having a cargo box is a liability, as it can be damaged by overhanging tree branches and other obstacles often found en route to recreational sites. Consequently, many individuals must own both a cargo box utility trailer and an open bed utility trailer to satisfy their load carrying needs. There are two obvious problems with owning two trailers. The first is the added expense of owning two trailers. A double-axle, open bed utility trailer typically costs from $2,000 to $4,000. A double-axle, cargo box utility trailer, on the other hand, can cost $2,000 more than a comparable open bed trailer. The second is the problem of finding space to park two utility trailers, a towing vehicle and other family transportation vehicles at one's residence. Many municipalities have regulations which prohibit the parking of vehicles, including trailers, on public streets for extended periods of time. In addition, having one's driveway cluttered with vehicles and trailers is generally not endearing to neighbors.

What is needed is a convertible utility trailer that can be used as both an open-bed trailer and a cargo box trailer. Ideally, the conversion process should be simple, quickly executable, and capable of being performed by a single individual. If these criteria are not met, there is little likelihood that such a trailer could be a commercial success.

SUMMARY OF THE INVENTION

The present invention solves the heretofore expressed need for a convertible utility trailer that can be used as both an open-bed trailer and a cargo box trailer. The convertible trailer includes a specially-designed, open-bed, walled utility trailer having multiple full-length, parallel, longitudinal grooves in the bed thereof. Adjacent each groove is a rail that is elevated slightly above the elevation of the bed. The rails function as friction reducers for a cargo box that is installable on the bed and within the walls of the utility trailer. Wood or steel decking can be used to fill spaces between the rails on the bed. A cargo box is designed for a slide-in, non-interference fit between the walls of the open bed trailer. Construction of the cargo box is conventional, except for several significant features which will be later explained. For a preferred embodiment of the invention, the cargo box includes a frame constructed of structural metal, such as but not limited to steel and aluminum. The frame is covered with metal, wood or composite sheathing to provide a generally weatherproof enclosure. For a preferred embodiment of the invention, at least one lockable door is incorporated in the rear end of the cargo box. The first significant deviation from conventionality is the inclusion of a plurality of vertically oriented anchors which are welded, bolted, or otherwise attached to the underside of the cargo box frame. These anchors are positioned to align with the longitudinal grooves of the open bed utility trailer. The cargo box is designed to slide onto the bed of the trailer. When properly positioned on the trailer, the anchors are removably secured to the bed of the trailer using bolts or removable locking pins. The second deviation from conventionality is the inclusion of at least four jack attachment points on the cargo box. One jack attachment point on each side of the front of the cargo box permits a jack to be installed on the cargo box such that its jacking stand is spaced wider than the track of the trailer, plus the width of any fenders thereon. An additional jack attachment point is located at the rear of the cargo box on either the side or rear end thereof. When the anchors on the cargo box are not secured to the bed of the trailer and at least four jacks are installed at the attachment points, the cargo box can be elevated over the trailer, and the trailer can be pulled from beneath the cargo box. Replacement of the cargo box on the trailer is the reverse of the removal process. of the cargo box.

DETAILED DESCRIPTION OF THE INVENTION

The invention will now be described with reference to the attached drawing figures. FIGS. 1 through 9 depict a double-axle first embodiment of the convertible trailer, which employs a jack attached to each of the four corners of the cargo box to elevate the cargo box after detaching it from the walled utility trailer so that the trailer can be pulled from beneath the cargo box. FIGS. 10 through 15 depict a single-axle second embodiment of the convertible trailer, which employs a single jack to elevate the front portion of the unit so that the cargo box can be rolled down the walled utility trailer with a winch and cable after the former is detached from the latter.

Figure 1:
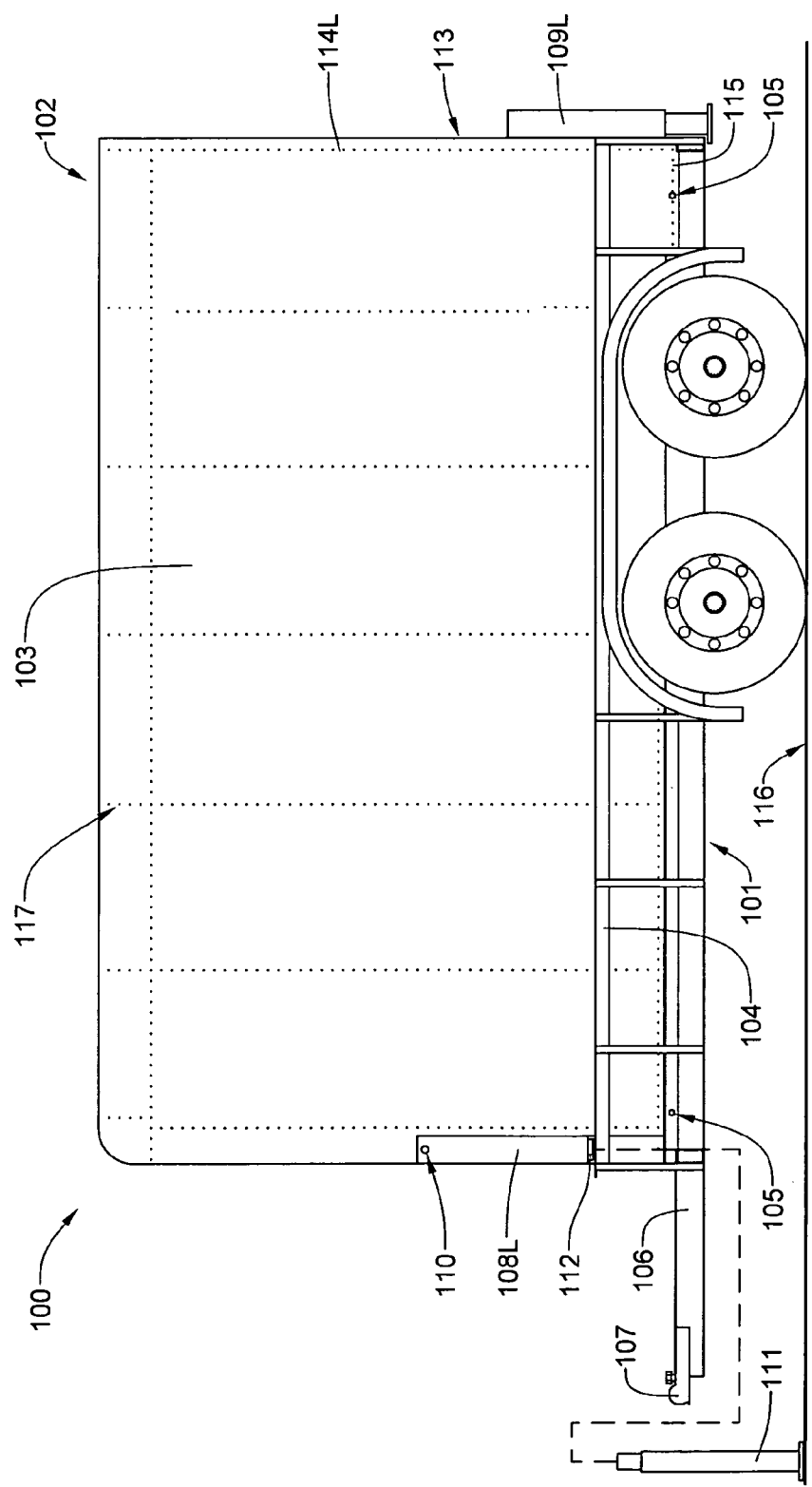
FIG. 1 is a side elevational assembled view of a double-axle, first embodiment convertible trailer, showing the cargo box installed on the walled utility trailer.

Referring now to FIG. 1, this assembled view of the double-axle, first embodiment convertible trailer 100, combines a double-axle utility trailer 101 and a cargo box 102. The cargo box 102 has a skeleton frame (shown in FIG. 3) to which is riveted metal sheeting 103. Although the utility trailer 101 is shown as having a perimetric fence 104, this is not an essential element of the convertible trailer 100, as the invention can be practiced using a flat-bed utility trailer as well. The cargo box 102 is secured to the utility trailer 101 with fasteners 105, such as, but not limited to, locking pins and screw-type fasteners (e.g., bolts and nuts). The utility trailer 101 has a tongue 106 and a coupler 107 attached to the tongue 106. The cargo box 102 is equipped with a jack secured to each of the four corners thereof. In this drawing figure, the left-side front jack 108L and the left-side rear jack 109L are visible. The right-side jacks 108R and 109R are visible in subsequent drawing figures. The circular aperture near the top of each of the jack is a receptacle 110 for a removeable jack hand crank (not shown). It will be noted that each front jack 108L and 108R has a removable strut 111, which can be inserted into the extendable center post 112 of each front jack. Although for this particular embodiment of the invention, the rear jacks 109L and 109R are secured to the rear vertical surface 113 of the cargo box, for an alternative embodiment of the invention, the rear jacks 109L and 109R may be incorporated into the rear corner posts 114L and 114R (the latter corner post is not visible in this drawing figure). If the rear jacks 109L and 109R are incorporated into the rear corner posts 114L and 114R, it is necessary either to extend the cargo box 102 over the rear edge of the platform 115 of utility trailer 101 or notch the rear edge of the platform 115 beneath each jack 109L and 109R. The ground is represented by item number 116. The rivets, which secure the metal sheeting 103 to the skeleton frame are represented by item number 117.

Figure 2:
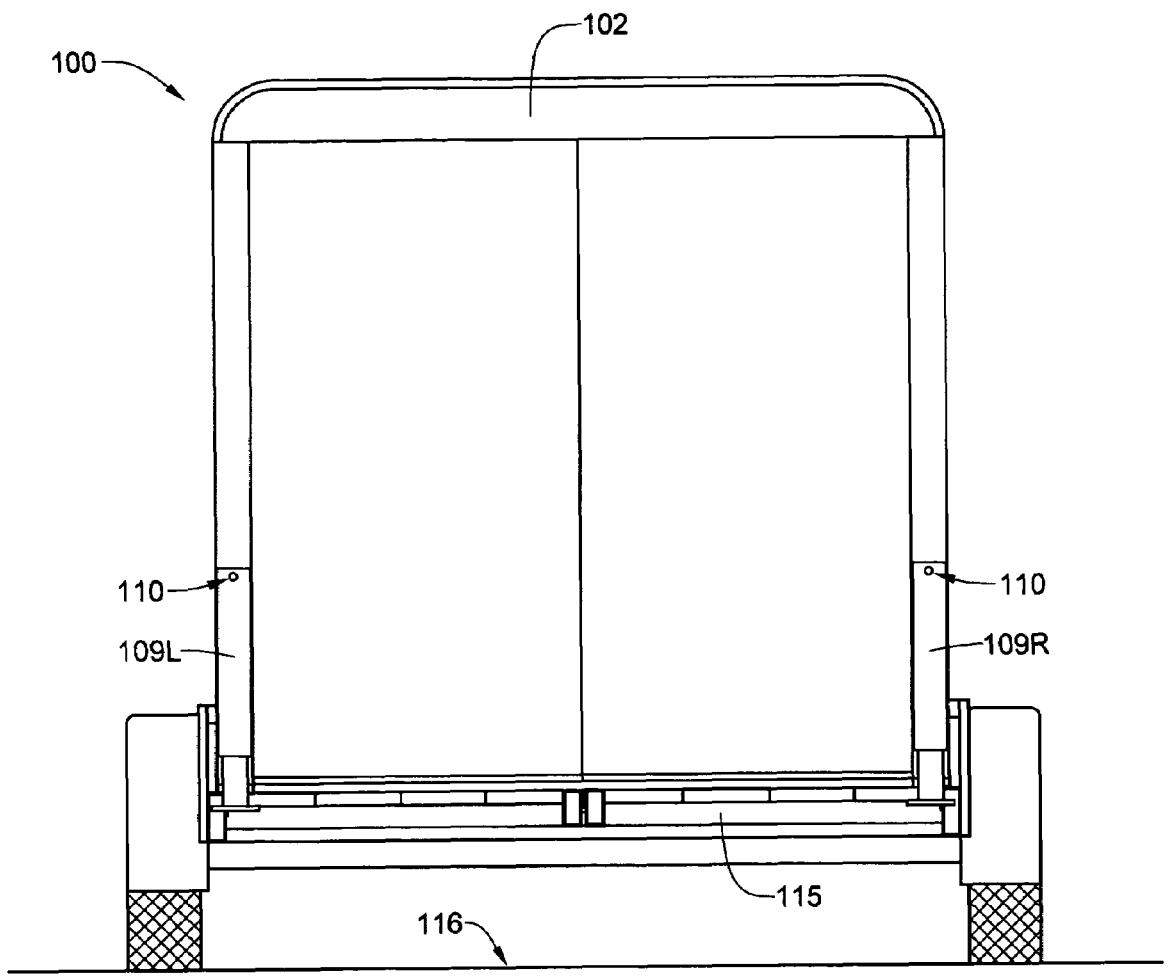
FIG. 2 is a rear elevational assembled view of the first embodiment convertible trailer, showing the cargo box installed on the walled utility trailer.

Referring now to FIG. 2, this rear view of the first embodiment convertible trailer 100 shows the cargo box 102 mounted atop the double-axle utility trailer 101. Both rear jacks 109L and 109R are visible in this view, as is the hand crank receptacle 110 for each rear jack.

Figure 3:
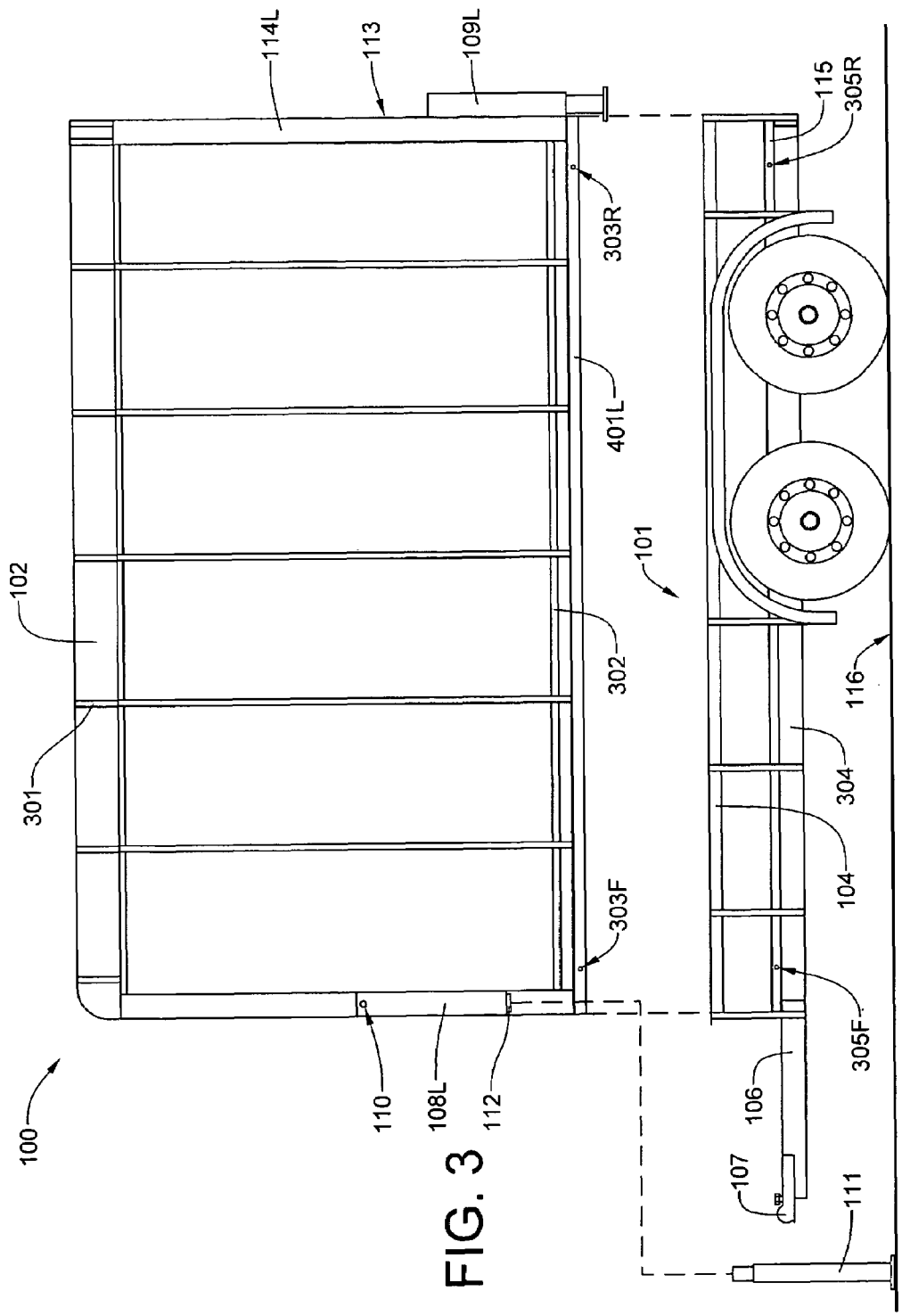
FIG. 3 is a side elevational exploded view of the first embodiment convertible trailer, showing the cargo box elevated above the open-bed, walled utility trailer.

Referring now to the side view of FIG. 3, the cargo box 102 is shown elevated above the double-axle utility trailer 101 following removal of the fasteners 105. It will be noted that in this view, the cargo box 102 is shown as a skeleton frame 301 with the outer sheeting 103 removed to show the edge of the flooring 302. which covers a bottom portion of the skeleton frame 301. It will also be noted that the cargo box 102 is equipped with fastener apertures 303F and 303R, and the frame rails 304 of the utility trailer 101 are also equipped with fastener apertures 305F and 305R. It should be understood that it is unnecessary, and certainly not adviseable, to raise the cargo box 102 to such a height in order to pull the utility trailer 101 from beneath the cargo box 102; it is necessary to elevate the cargo box 102 only enough so that is is not is contact with the upper surface of the platform 115 of the utility trailer 101. An elevation of 1 to 2 centimeters is generally sufficient if the trailer is parked on level ground.

Figure 4:
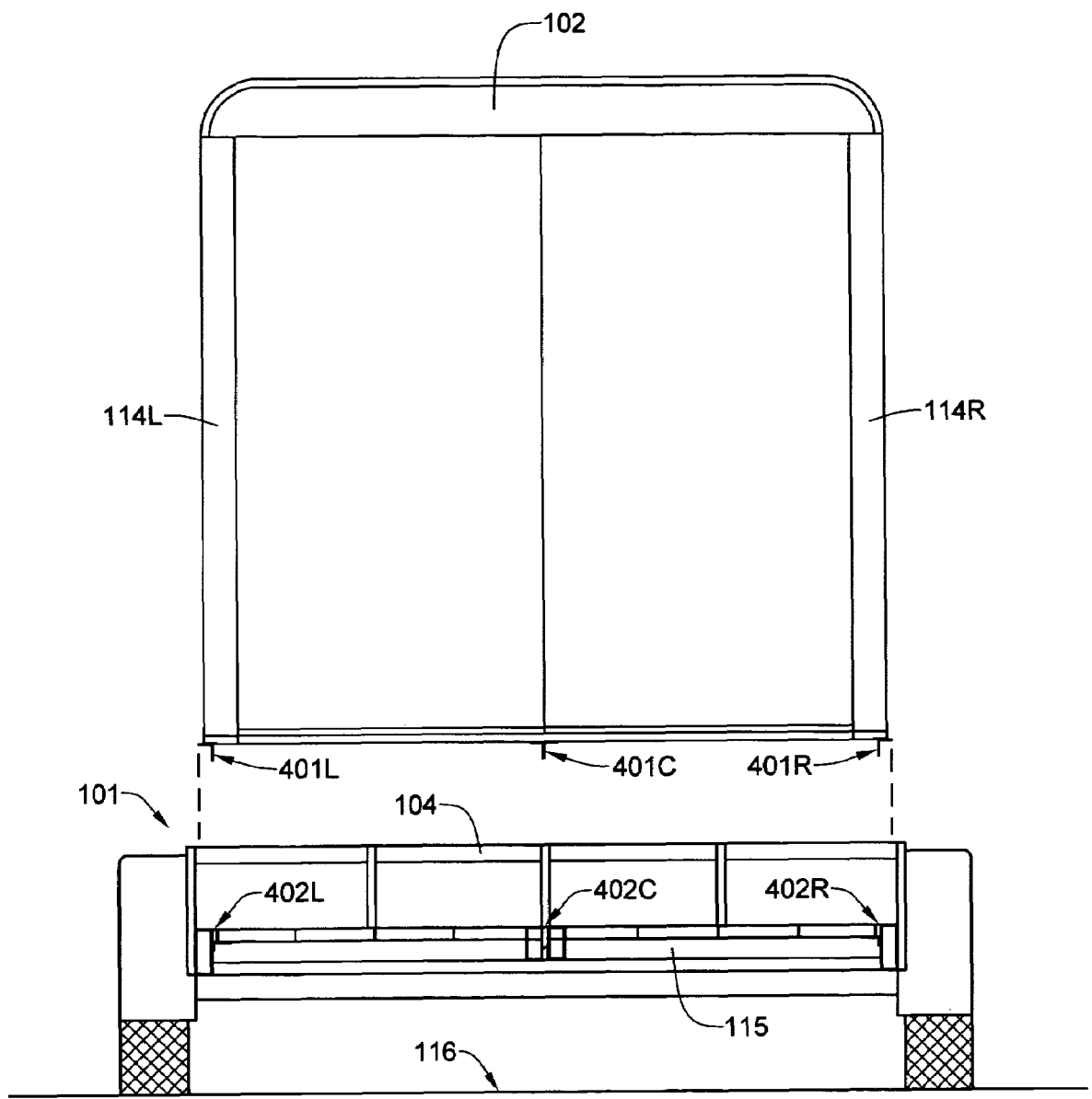
FIG. 4 is a rear elevational exploded view of the first embodiment convertible trailer, showing the cargo box elevated above the open-bed, walled utility trailer.

Referring now to the rear view of FIG. 4, the cargo box 102 is shown elevated above the double-axle utility trailer 101 following removal of the fasteners 105. It will be noted that the cargo box 102 is equipped with three downwardly-projecting longitudinal ribs: a left rib 401L, a center rib 401C and a right rib 401R. Each of the downwardly-projecting ribs 401L, 401C and 401R fit into a corresponding longitudinal groove 402L, 402C and 402R, respectively, in the platform 115 of the utility trailer 101. The ribs 401L, 401C and 401R cooperate with the longitudinal grooves 402L, 402C and 402R to align and center the cargo box 102 as it slides on or off the utility trailer 101. For a preferred embodiment of the invention, the apertures 303F and 303R are located in the left and right ribs fasteners 401L and 401R, respectively.

Figure 5:
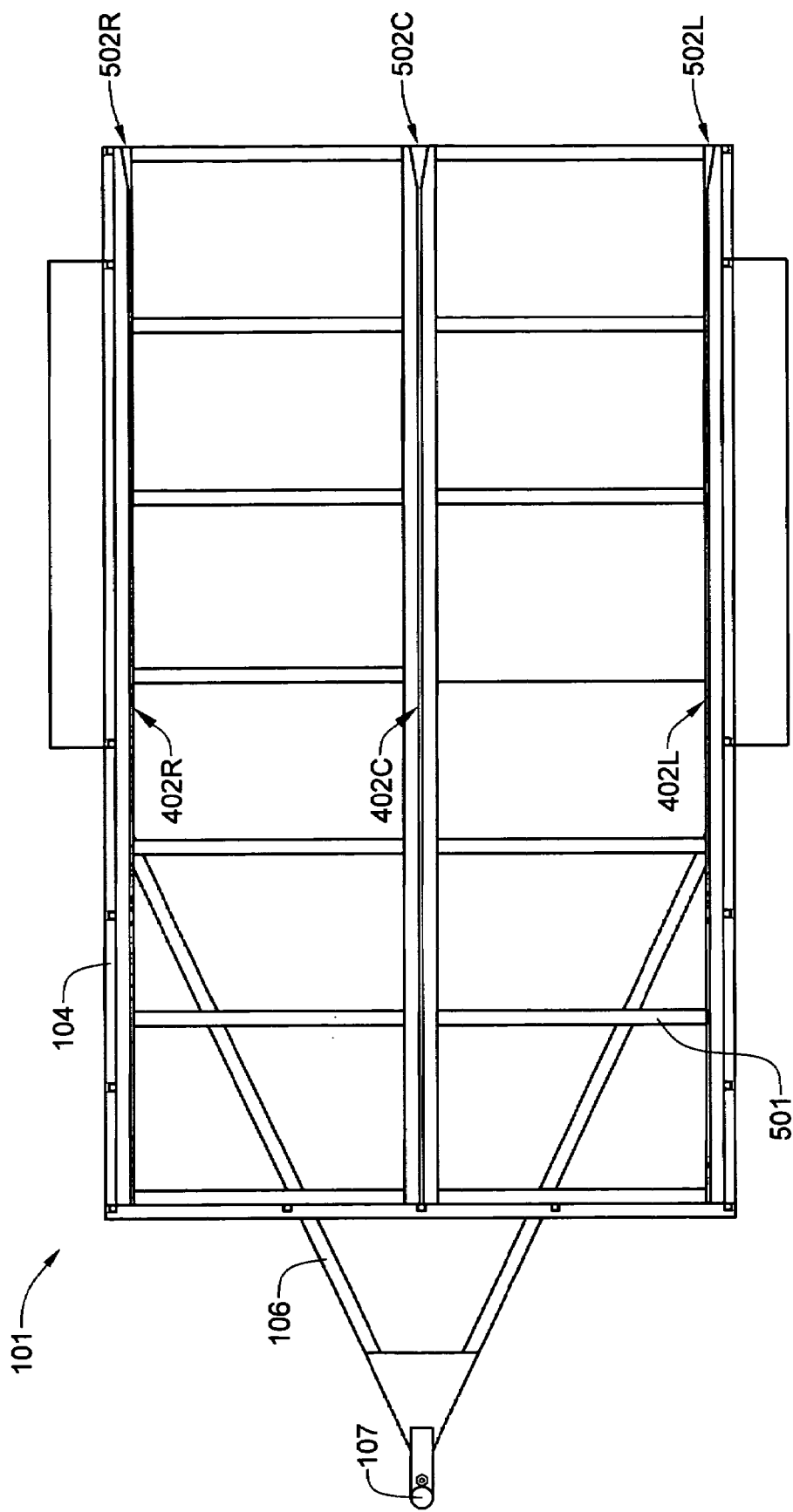
FIG. 5 is a top plan view of the walled utility trailer frame of the first embodiment convertible trailer.

Referring now to FIG. 5, the utility trailer 101 is shown from above with the planking removed to show the utility trailer framework 501. It will be noted that each of the longitudinal grooves 402L, 402C and 402R extend the entire length of the platform 109. The rearmost end of each groove 402L, 402C and 402R has a widened entrance 502L, 502C and 502R, respectively, which facilitates alignment of the ribs 401L, 401C and 401R when installing the cargo box 102 on the utility trailer 101.

Figure 6:
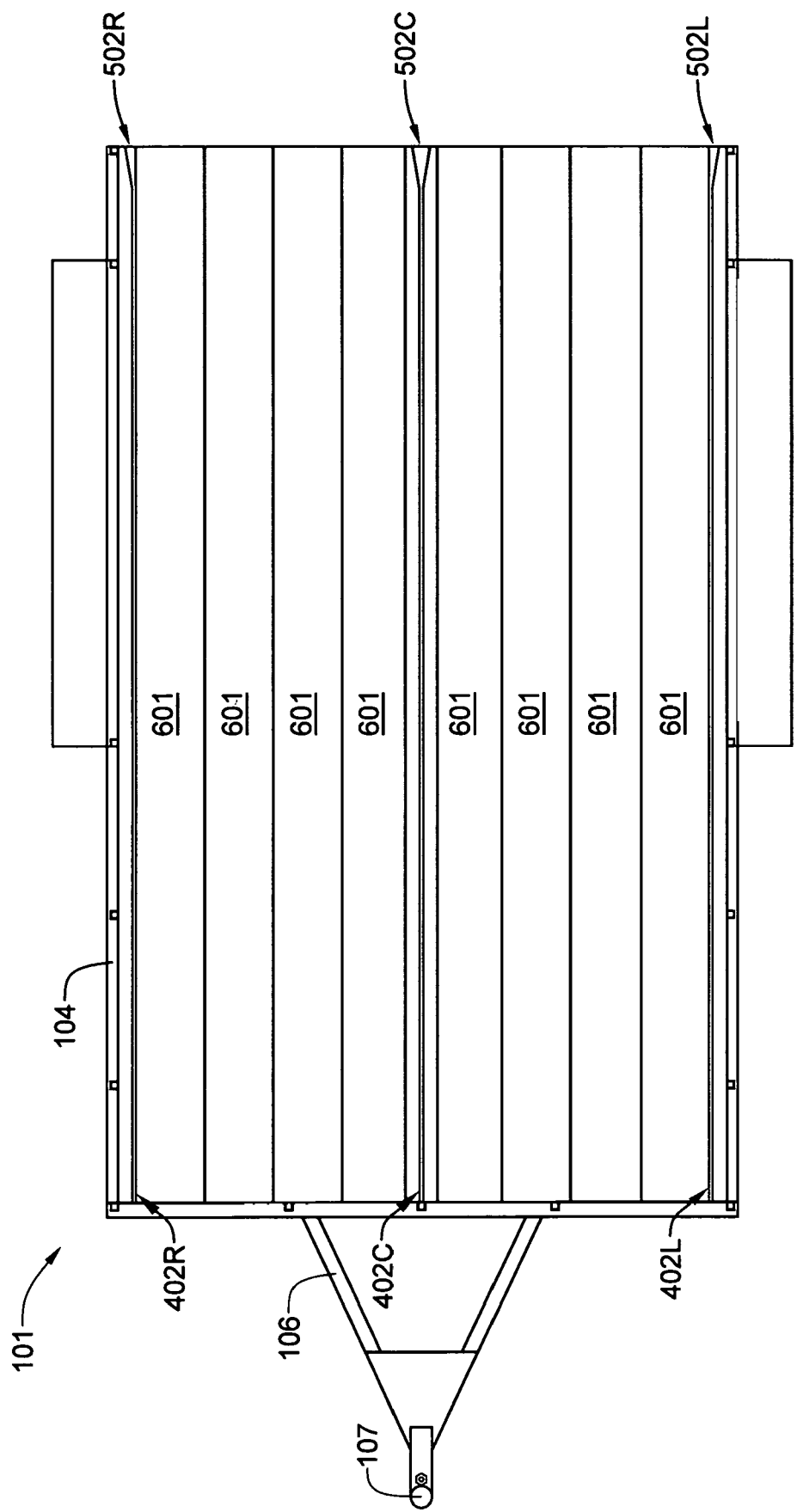
FIG. 6 is a top plan view of the walled utility trailer frame of the first embodiment convertible trailer, after installation of planking thereon.

Referring now to FIG. 6, the utility trailer framework 501 has been covered with planking 601 in order to complete the platform 109.

Figure 7:
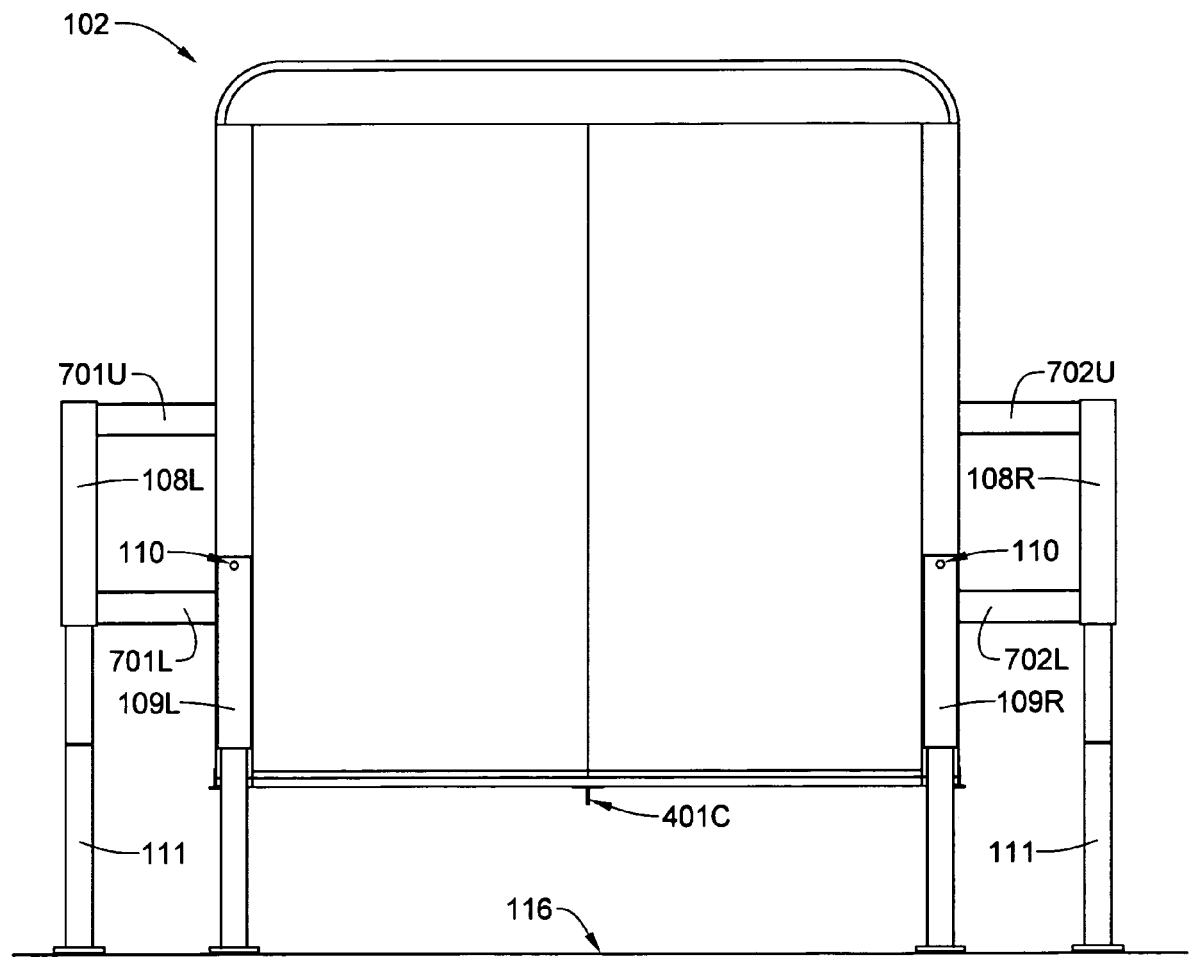
FIG. 7 is a rear elevational view of the cargo box and the fore and aft lifting and support apparatus of the first embodiment convertible trailer.

Referring now to FIG. 7, the cargo box 201 is shown from the rear, supported on its four corner jacks 108L, 108R, 109L and 109R. As will subsequently be appreciated, the left-side front jack 108L is mounted to a pair of horizontal beams 701U and 701L, while the right-side front jack 108R is mounted to a pair of horizontal beams 702U and 702L. Each pair of horizontal beams 701U/701L and 702U/702L can be extended from and retracted into the skeleton frame 103 of the cargo box 102.

Figure 8:
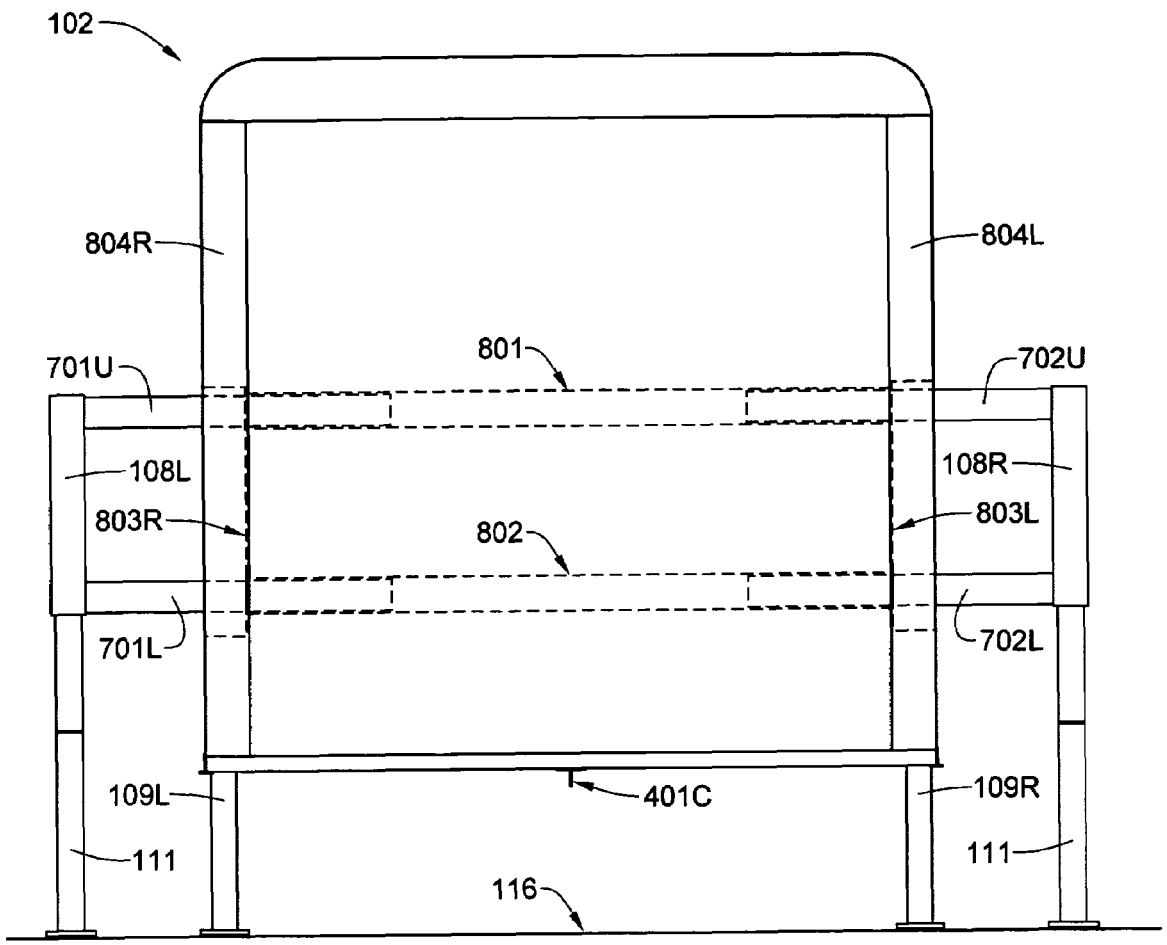
FIG. 8 is a front elevational view of the cargo box and the fore and aft lifting and support apparatus of the first embodiment convertible trailer.

Referring now to FIG. 8, the cargo box 201 is shown from the front, supported on its four corner jacks 108L, 108R, 109L and 109R. In this view, it can be seen that upper horizontal beams 701U and 702U both slide into an upper, transverse, horizontal jack support tube 801, while lower horizontal beams 701L and 702L slide into a lower, transverse, horizontal jack support tube 802. The front left jack 108L, when fully retracted and with the strut 111 removed, fits into a left recess 803L in the left front corner post 804L of the cargo box 102. Likewise, the front right jack 105R, when fully retracted and with the strut 109 removed, fits into a right recess 803R in the right front corner post 804R of the cargo box 102.

Figure 9:
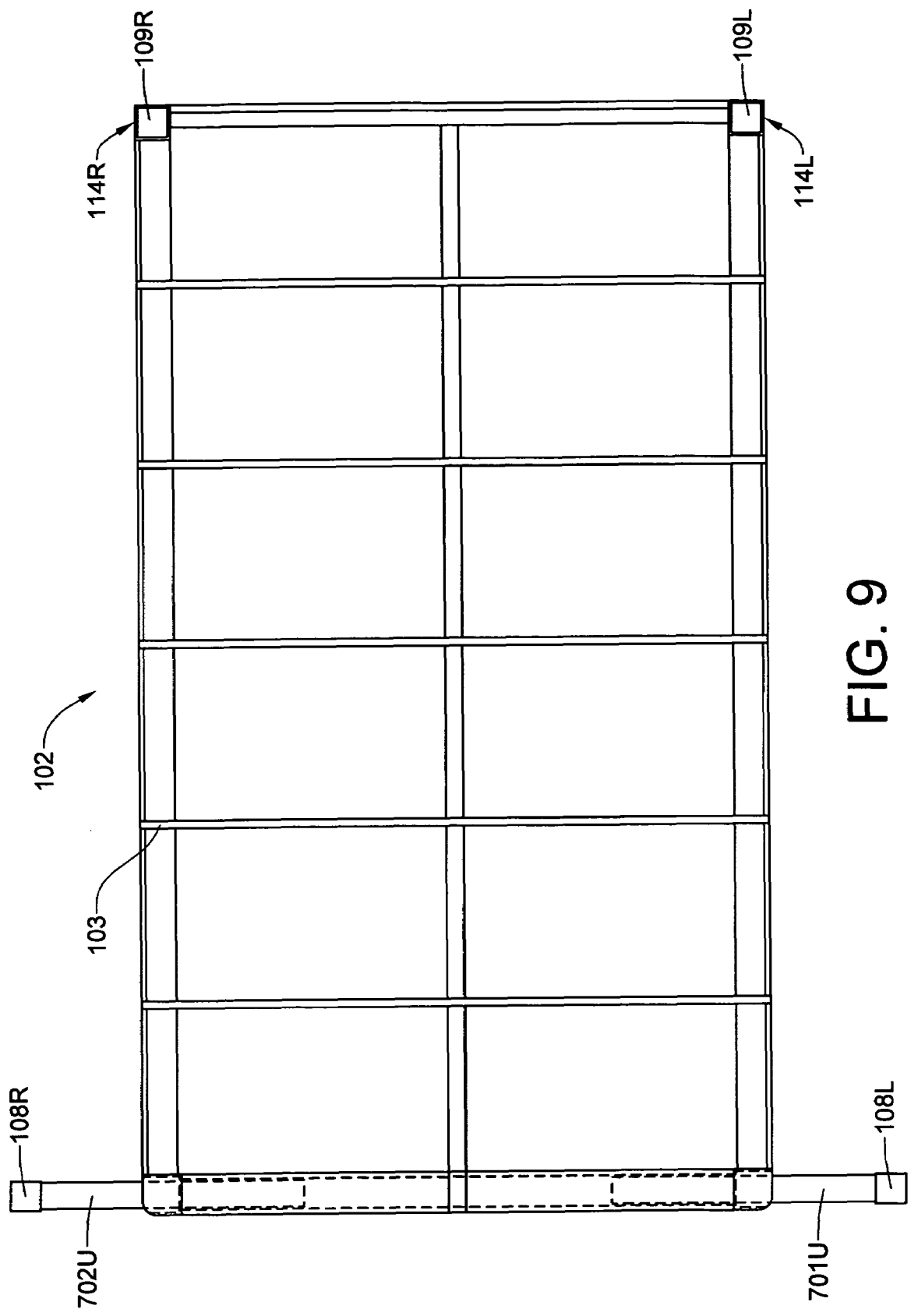
FIG. 9 is a top plan view of the cargo box and the fore an aft lifting and support apparatus of the first embodiment convertible trailer.

Referring now to FIG. 9, the cargo box skeleton frame 103 is shown from the top with the front corner jacks 108L and 108R deployed. For this particular embodiment, the rear corner jacks 109L and 109R have been incorporated into the rear corner posts 114L and 114R of the skeleton frame 103.

Figure 10:
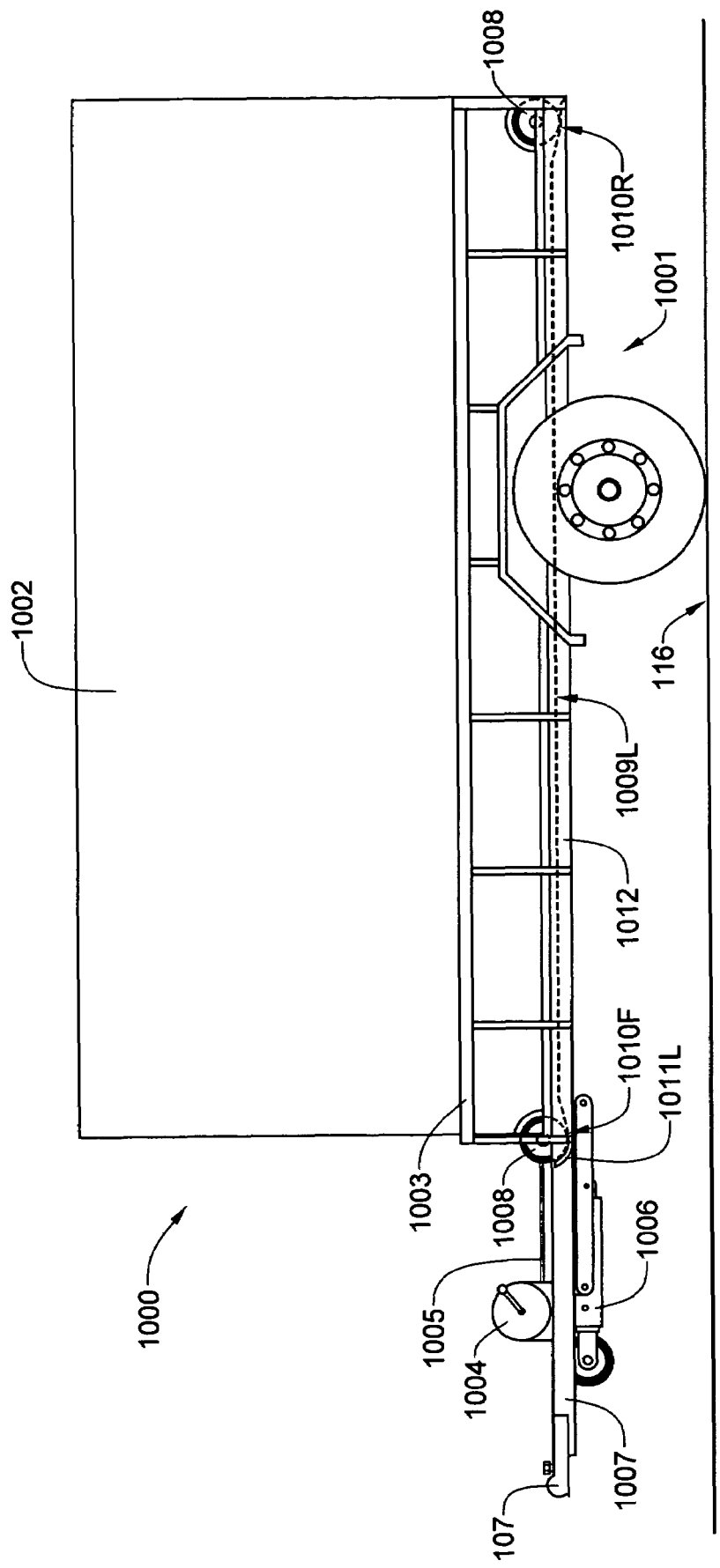
FIG. 10 is a side elevational assembled view of a single-axle, second embodiment convertible trailer, showing the cargo box installed on the walled utility trailer.

Referring now to FIG. 10, this assembled view of the single-axle, second embodiment convertible trailer 1000, combines a single-axle utility trailer 1001 and a cargo box 1002. Although this particular embodiment of the utility trailer 1001 incorporates a fence 1103 around the permiter of the bed 1012, a flat-bed trailer having no fence or wall may also be used. The second embodiment convertible trailer 1001 incorporates a winch 1004, which is coupled to the cargo box 1002 with a cable 1005. A foldable jack 1006 is pivotably mounted to to tongue 1007 of the utility trailer 1001. The cargo box 1002 incorporates a recessed, rubber-tired wheel 1008 rotatably mounted at each corner thereof. The wheels 1008 on the left side of the cargo box 1002 ride in a left recessed track 1009L, while the wheels 1008 (not shown in this view) on the right side of the cargo box 1002 ride in a right recessed track 1009R. Both recessed tracks 1009L and 1009R, which are parallel and run the length of the bed, may also be characterized as longitudinal guides or grooves. It will be noted that the left recessed track 1009L has a front depression 1010F and a rear depression 1010R. The right recessed track 1009R has similar depressions 1010F and 1010R. The depressions 1010F and 1010R permit the lower surface of the cargo box 1002 to rest on the bed 1012 of the utility trailer 1001 when the cargo box 1002 it in the installed position on the utility trailer 1001. It will also be noted that each recessed track 1009L and 1009R has a front extension, of which only the left extension 1011L is visible in this view.

Figure 11:
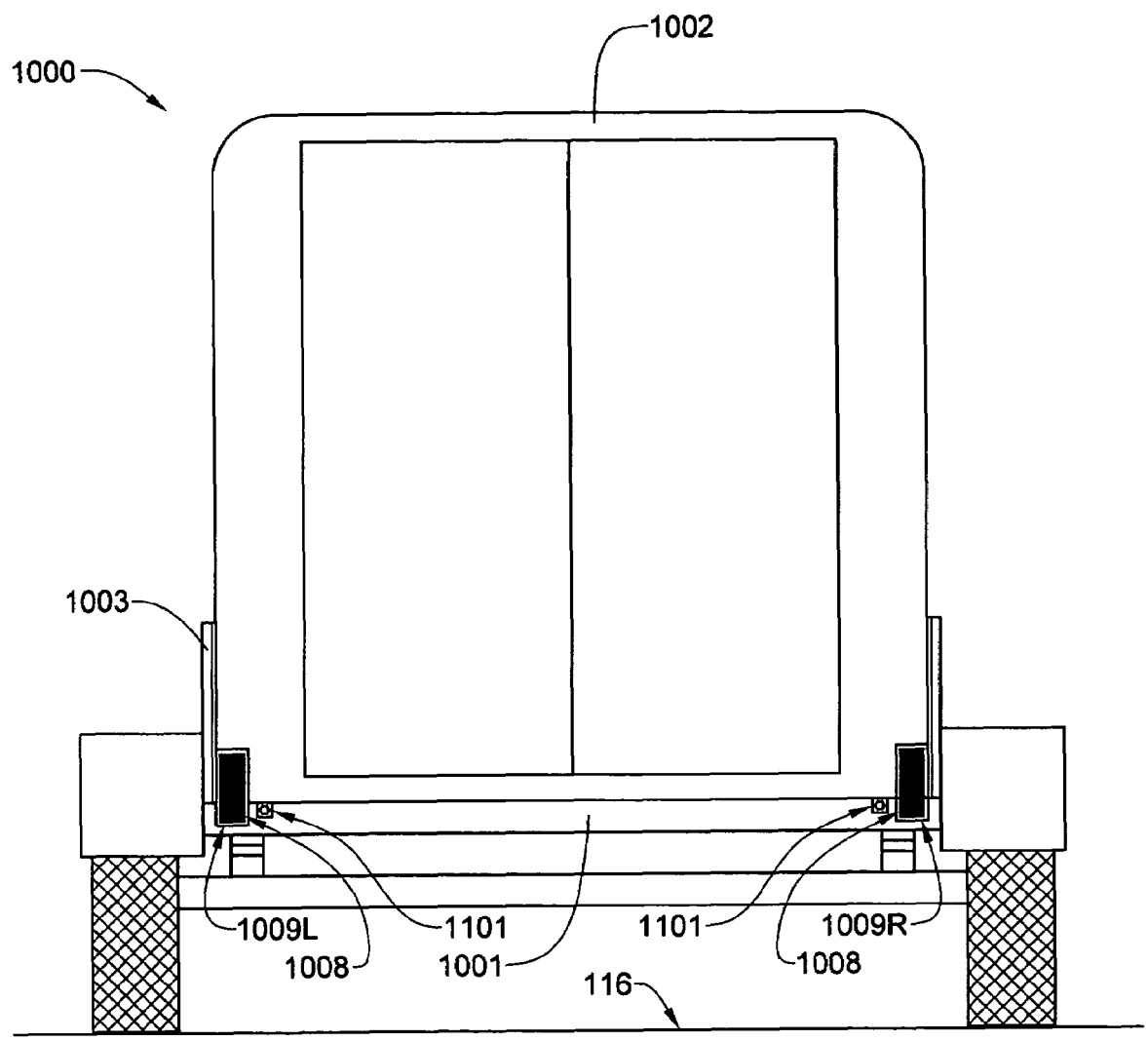
FIG. 11 is a rear elevational assembled view of the second embodiment convertible trailer, showing the cargo box installed on the walled utility trailer.

Referring now to FIG. 11, this rear view of the second embodiment convertible trailer 1000 shows the recessed rear wheels 1008 that are rotatably attached to the cargo box 1002. The rear left wheel 1008 rides in a left recessed track 1009L, while the rear right wheel 1008 rides in a right recessed track 1009R. As with the first embodiment convertible trailer 100, the cargo box 1002 is secured to the utility trailer 1001 with fasteners 1101, such as locking pins or threaded fasteners.

Figure 12:
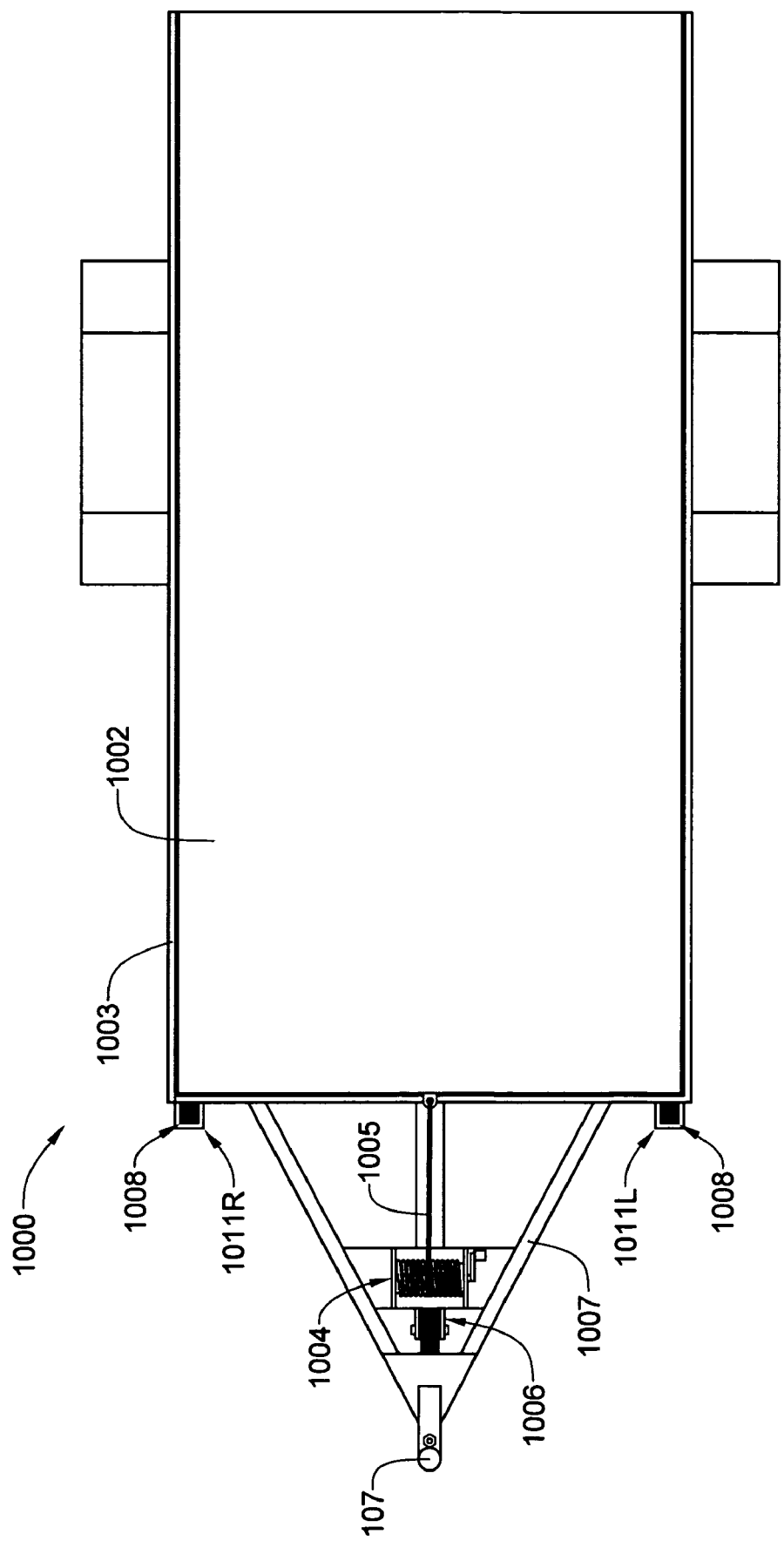
FIG. 12 is a top plan assembled view of the second embodiment convertible trailer.

Referring now to FIG. 12, the winch 1004, the cable 1005 and foldable jack 1006 are visible. It will be noted that the recessed right front rubber-tired wheel 1008 and the recessed left front rubber-tired wheel 1008 extend forward of the cargo box 1002 on track extensions 1011R and 1011L, respectively.

Figure 13:
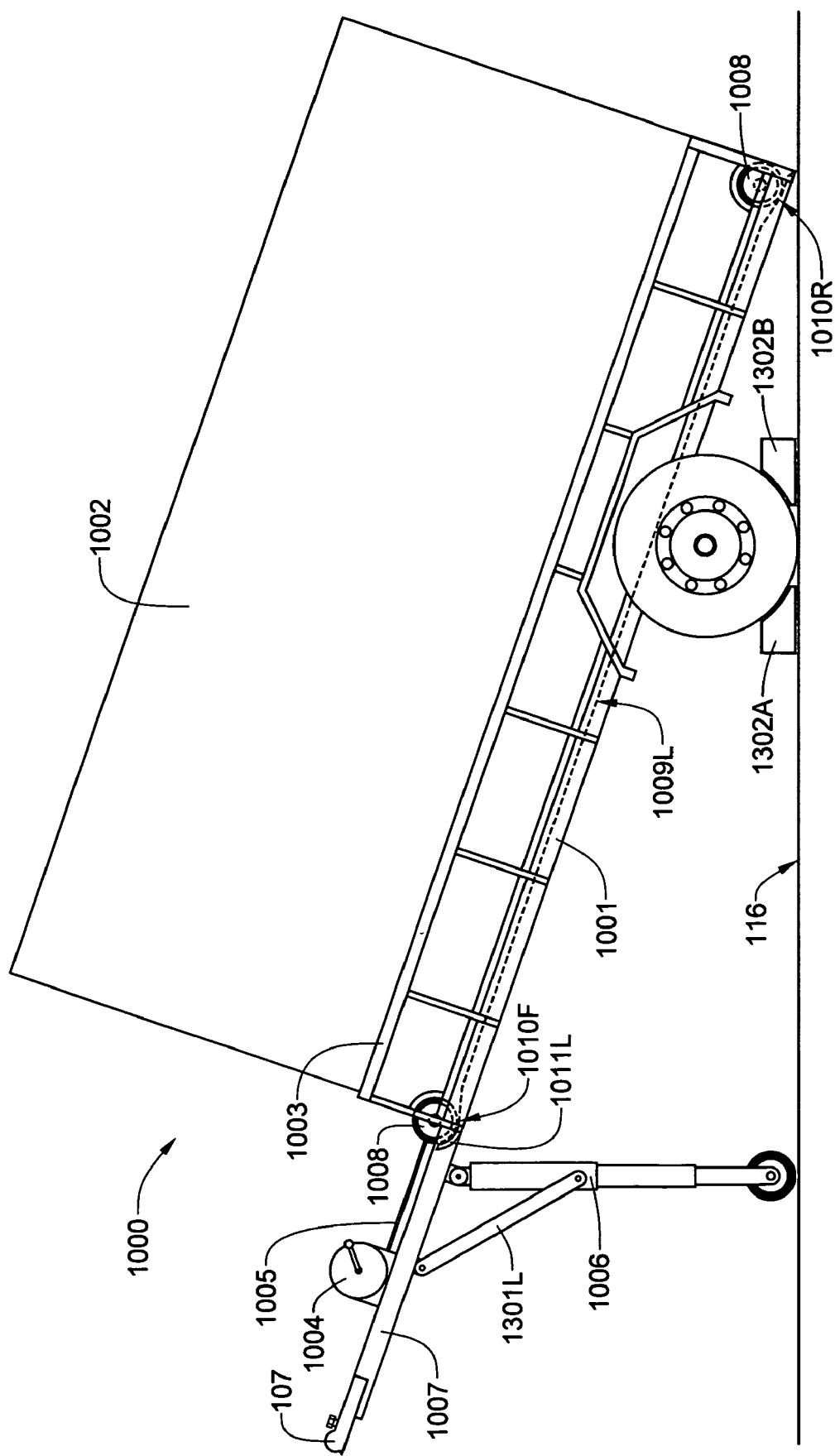
FIG. 13 is a side elevational view of the second embodiment convertible trailer after the cargo box has been released from the walled utility trailer, and following the elevation of the walled utility trailer and cargo box with the jack.

Referring now to FIG. 13, the foldable jack 1006 has been extended and braced to the tongue 1007 with a pair of diagonal braces 1301L and 1301R (the latter brace is not visible in this view). After unsecuring the cargo box 1002 from the utility trailer 1001 by removal of the fasteners 1102, the foldable jack 1006 is used to elevate the front and lower the rear of the utility trailer 1001. It will be further noted that chocks 1302A and 1302B have been placed in front of and behind the left wheel 1304 of the utility trailer 1001. Additional chocks (not shown) are also placed around the right wheel (also not shown in this view).

Figure 14:
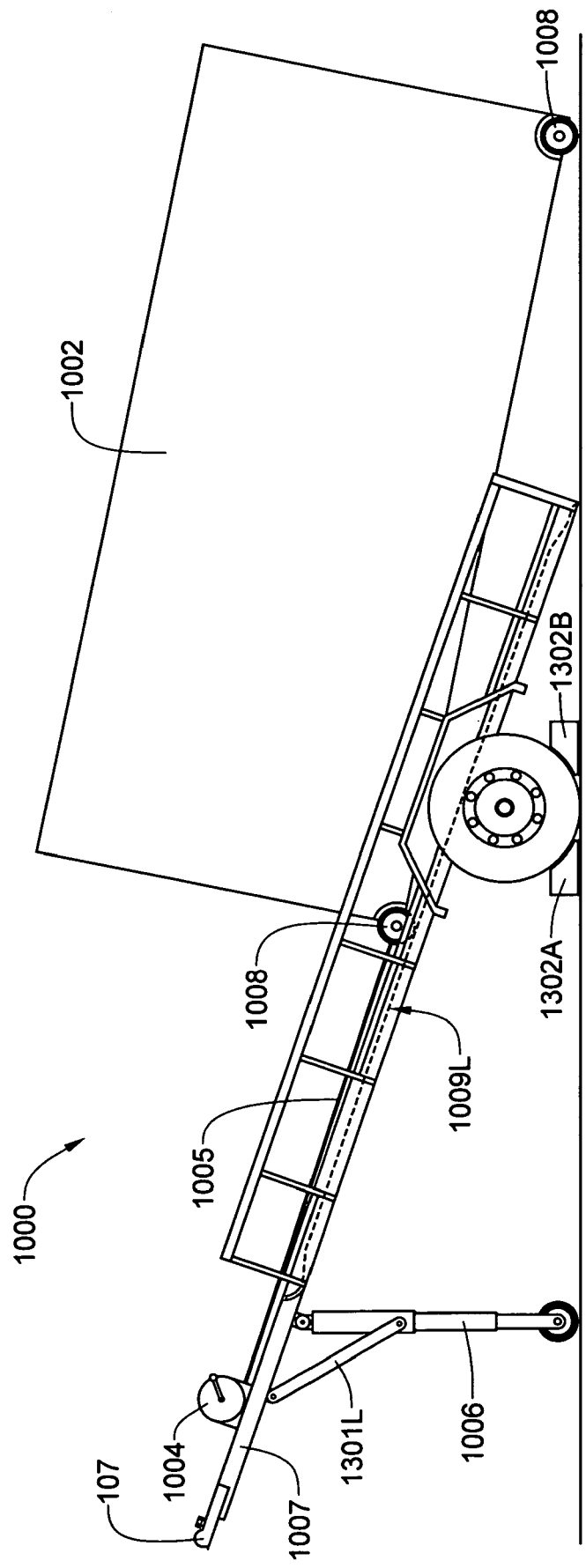
FIG. 14 is a side elevational view of the second embodiment convertible trailer after the cargo box has been allowed to roll down the walled utility trailer by letting out the loading cable with the attached winch.
Figure 15:
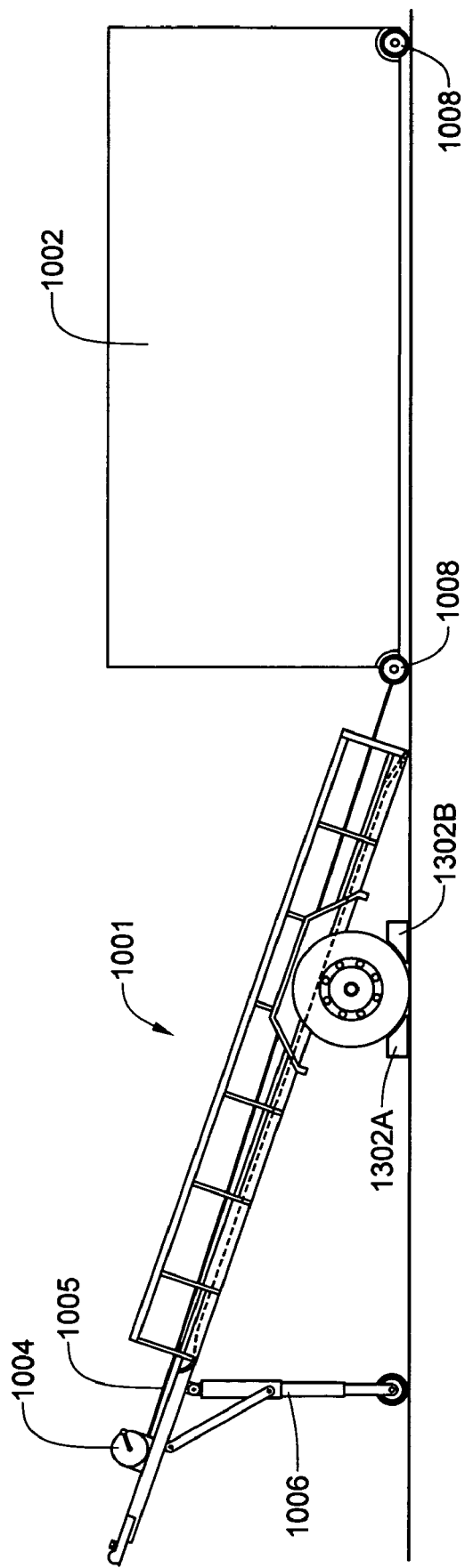
FIG. 15 is a side elevational view of the second embodiment convertible trailer after the cargo box has been allowed to roll completely free of the walled utility trailer by letting out additional cable with the winch.

Referring now to FIG. 14, as the cable 1005 is released using the winch 1004, the cargo box 1002 begins to roll down the recessed tracks 1009L and 1009R. In order to reduce friction, the front wheels 1008 rise out of the front depressions 1010F. The recessed rubber-tired rear wheels 1008 roll off the trailer 1001 and begin to roll on the ground 116.

By further releasing the cable 1005 with the winch 1004, the cargo box 1002 rolls completely off the trailer 1001. Replacement of the cargo box 1002 on the trailer 1001 is the exact opposite of the removal process. Once the cable 1005 is disconnected from the cargo box 1002, the single-axle utility trailer 1001 may be used independently of the cargo box. While it is unattached to the trailer 1001, the cargo box 1002 may serve as a stationary storage shed.

Although only several embodiments of the invention has been shown and described, it will be obvious to those having ordinary skill in the art that changes and modifications may be made thereto without departing from the scope and the spirit of the invention as hereinafter claimed.

What is claimed is:

1. A trailer convertible between an open bed utility configuration and a cargo box configuration comprises:

an open-bed utility trailer having a tongue and at least one axle and a wheel mounted at each end of said axle on opposite sides of the trailer;

a fully-enclosed cargo box having a floor, a permanent roof, walls and at least one door securable to said open-bed utility trailer; and four jacks secured to an outer perimeter of said cargo box, each of said jacks being stowable within a corner post of said cargo box, each of said jacks extendable to bear against the ground and, together, enabling said cargo box, after it is unsecured from said utility trailer, to be lifted above said utility trailer so that the latter may be rolled from beneath said cargo box or repositioned beneath said cargo box following separation of the two.

2. The trailer of claim 1, which further comprises at least one upward-facing longitudinal groove within the bed of said utility trailer and at least one guide affixed to the cargo box, said at least one longitudinal groove and said at least one guide cooperating to center and align the cargo box with respect to the utility trailer as the latter is rolled beneath the cargo box following separation of the utility trailer and cargo box.

3. The utility trailer of claim 2, wherein said at least one guide is a downwardly-projecting rib attached to a bottom surface of said cargo box.

4. The trailer of claim 1, wherein said cargo box is securable to said utility trailer with fasteners selected from the group consisting of locking pins and threaded fasteners.

5. A trailer convertible between an open bed utility configuration and a cargo box configuration comprises:

an open-bed utility trailer having a tongue and at least one axle and a wheel mounted at each end of said axle on opposite sides of the trailer;

a fully-enclosed cargo box of generally rectangular footprint having a floor, a permanent roof, walls, two front and two rear corner posts, and at least one door securable to said open-bed utility trailer; and a jack stowable within each of said corner posts, each of said jacks extendable to bear against the ground and, together, enabling said cargo box, after it is unsecured from said utility trailer, to be lifted above said utility trailer so that the latter may be rolled from beneath said cargo box, wherein each of a forward-mounted pair of said jacks is rigidly affixed to individual pairs of parallel, vertically-spaced, horizontally-disposed beams which retract into a front wall of the cargo box.

6. The trailer of claim 5, wherein each of a rear-mounted pair of said jacks is incorporated within a separate rear corner post of said cargo box.

7. The trailer of claim 5, which further comprises at least one upwardly-facing longitudinal groove within the bed of said utility trailer and at least one downwardly-facing rib affixed to the cargo box, said at least one longitudinal groove and said at least one rib cooperating to center and align the cargo box with respect to the utility trailer as the former is removed therefrom or replaced thereon.

8. The trailer of claim 7, wherein each upward-facing longitudinal groove has a widened entrance at the rear of the trailer to facilitate initial entry of one of said downwardly-facing ribs into that groove.

9. The trailer of claim 7, wherein a plurality of fasteners selected form the group consisting of locking pins and threaded fasteners are employed to secure each rib to an associated one of said grooves.

10. The trailer of claim 5, wherein said cargo box is securable to said utility trailer with fasteners selected from the group consisting of locking pins and threaded fasteners.

11. A trailer convertible between an open bed utility configuration and a cargo box configuration comprises:

an open-bed utility trailer having a tongue and at least one axle and a wheel mounted at each end of said axle on opposite sides of the trailer;

a cargo box having a floor, a roof, walls and at least one door securable to said open-bed utility trailer; and at least one upwardly-facing longitudinal groove within the bed of said utility trailer and an associated downwardly-facing rib affixed to the cargo box for each longitudinal groove, said at least one longitudinal groove and its associated rib cooperating to center and align the cargo box with respect to the utility trailer as the former is removed therefrom or replaced thereon, said at least one upward-facing longitudinal groove having a widened entrance at a rear end of the trailer to facilitate initial entry of an associated downwardly-facing rib therein.

12. The trailer of claim 11, wherein said means for removing and replacing comprises at least one upward-facing longitudinal groove within the bed of said utility trailer and at least one guide affixed to the cargo box, said at least one longitudinal groove and said at least one guide cooperating to center and align the cargo box with respect to the utility trailer as the former is removed therefrom or replaced thereon.

13. The utility trailer of claim 11, wherein said at least one guide is a downwardly-projecting rib attached to a bottom surface of said cargo box.

14. The utility trailer of claim 11, wherein said means for removing and replacing further comprises at least four jacks secured to an outer perimeter of said cargo box, each of said jacks extendable to bear against the ground and, together, enabling said cargo box, after it is unsecured from said utility trailer, to be lifted above said utility trailer so that the latter may be rolled from beneath said cargo box.

15. The utility trailer of claim 14, wherein each of said jacks is stowable within a corner post of said the cargo box.

16. The trailer of claim 11, wherein said cargo box is securable to said utility trailer with fasteners selected from the group consisting of locking pins and threaded fasteners.

17. The trailer of claim 16, wherein a plurality of fasteners selected form the group consisting of locking pins and threaded fasteners are employed to secure each rib to an associated groove.

* * * * *